United States Patent [19]
Micheller et al.

[11] 3,735,569
[45] May 29, 1973

[54] WATER-STEAM SEPARATOR

[75] Inventors: Rudolph J. Micheller, East Granby, Conn.; Robert C. Patterson, Longmeadow, Mass.

[73] Assignee: Combustion Engineering, Inc., Windsor, Conn.

[22] Filed: Sept. 7, 1971

[21] Appl. No.: 178,105

[52] U.S. Cl. ................55/348, 55/452, 55/455, 122/34, 122/488
[51] Int. Cl. ................................B01d 45/12
[58] Field of Search................55/452, 455, 456, 55/457, 348; 122/34, 488–491

[56] References Cited
UNITED STATES PATENTS

| | | | |
|---|---|---|---|
| 1,784,627 | 12/1930 | Hamill | 55/452 |
| 2,763,245 | 9/1956 | Place | 55/455 |
| 3,603,062 | 9/1971 | Robbins et al. | 55/457 |
| 3,614,863 | 10/1971 | Patterson et al. | 55/452 |

*Primary Examiner*—Bernard Nozick
*Attorney*—Robert L. Olson

[57] ABSTRACT

A water-steam separator made up of a number of "-cell" structures, each cell having a vertical cylindrical member with a spinner arranged in its lower portion, and holes through the walls thereof above the spinner. A housing surrounds, and extends above, the cylindrical member. A plate with a central opening therein is positioned within the housing above the cylindrical member.

3 Claims, 3 Drawing Figures

3,735,569

WATER-STEAM SEPARATOR

BACKGROUND OF THE INVENTION

The invention relates to a separator for separating water from steam in a saturated steam generator. In saturated steam generators which supply steam to steam turbines in a saturated state, i.e., not superheated, it is important that the steam leaving the generator be as dry as possible. It is also desirable to make the separating equipment of large capacity, so that the size thereof may be kept to a minimum, which will also keep the overall steam generator size as small as possible.

SUMMARY OF THE INVENTION

The separator equipment of the present invention is comprised of a plurality of small separators, each one of which has vertical cylinder spinner vanes located in the lower portion of the cylinder and openings in the walls of the cylinder above the spinning vanes, through which centrifugally separated water can be discharged. A housing surrounds the cylinder and extends above it. A plate having a central opening therein is positioned within the housing above the cylinder, to prevent re-entrainment of separated water.

DESCRIPTION OF THE PREFERRED EMBODIMENT

Figure 1:
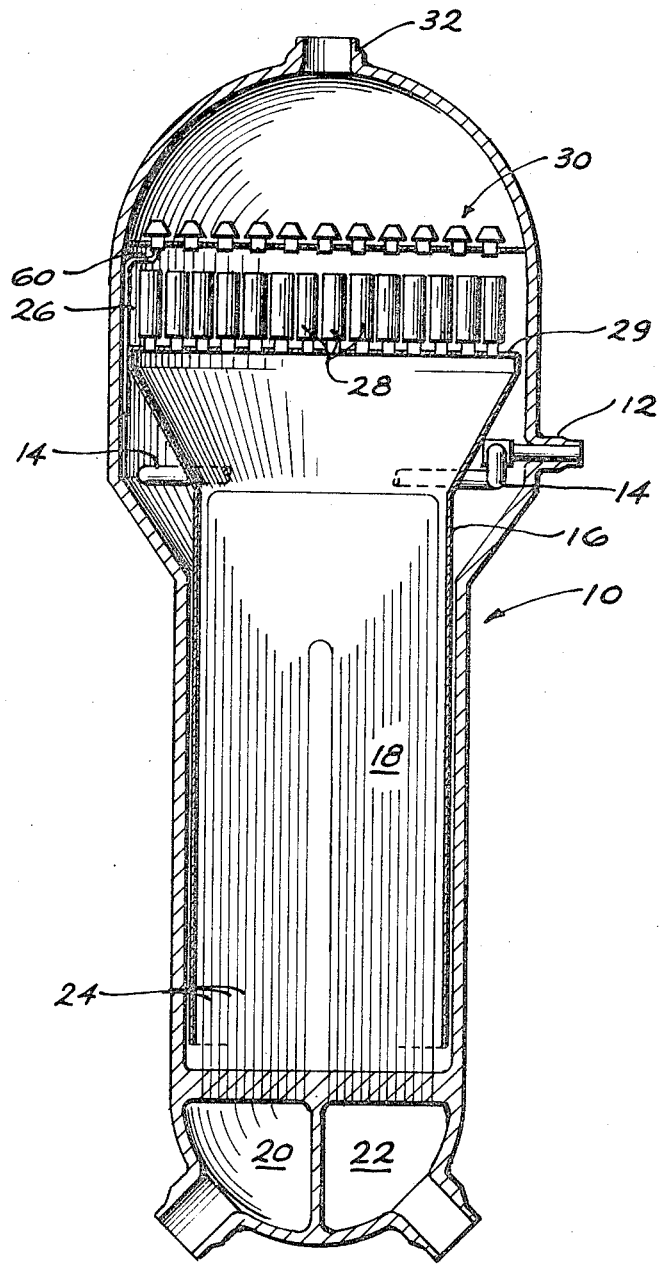
FIG. 1 is a vertical section of a shell and tube type vapor generator having a water separator constructed in accordance with the present invention.

Looking now to FIG. 1 of the drawings, 10 designates a shell and tube type saturated steam generator in its entirety. Feedwater enters the generator vessel through inlet 12, and flows into the annular ring distribution header 14. This water is discharged through a plurality of openings in the header 14, which openings are evenly distributed around the entire circumference of the header. The water flows downwardly between an inner shroud 16 and the walls of the vessel. The water upon reaching the bottom of the vessel flows beneath the lower edge of shroud 16 into the central portion 18 of the vessel, where it is heated by a heating fluid flowing within the tubes 24.

The heating medium enters tubes 24 from inlet manifold 20, and exist by way of outlet manifold 22. The water, after being heated to the point where some steam has been generated, flows through openings in upper plate 29, and then through separator equipment 26, where a majority of the water is separated, and flows over the outer edge of plate 29 into the annular space between the vessel wall and the shroud 16, to be recycled. The separator is comprised of a plurality of "cell" structures, which will be described in further detail below.

The steam continues its upward flow, through a plate dryer section 30, where any moisture remaining in the now relatively dry steam is removed. The dried steam exits through outlet 32 to its point of use, for example a turbine.

Figure 2:
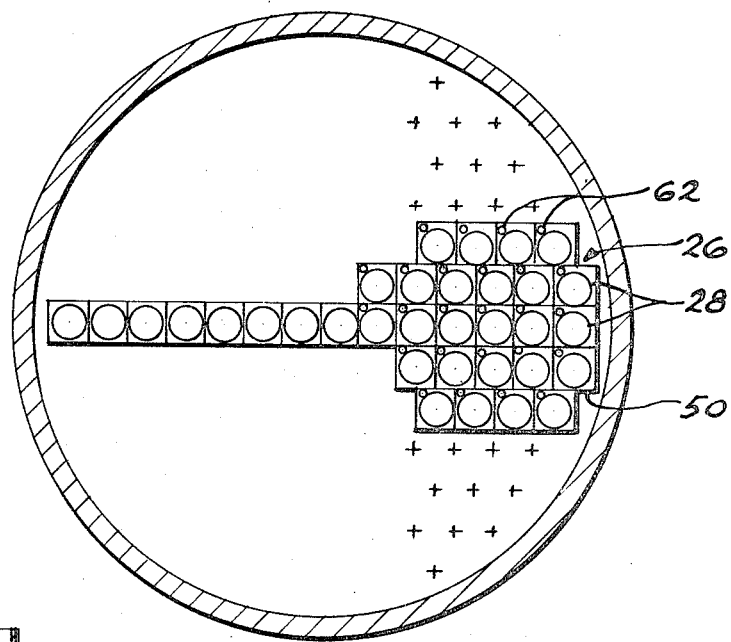
FIG. 2 is a plan view taken on lines 2—2 of FIG. 1.
Figure 3:
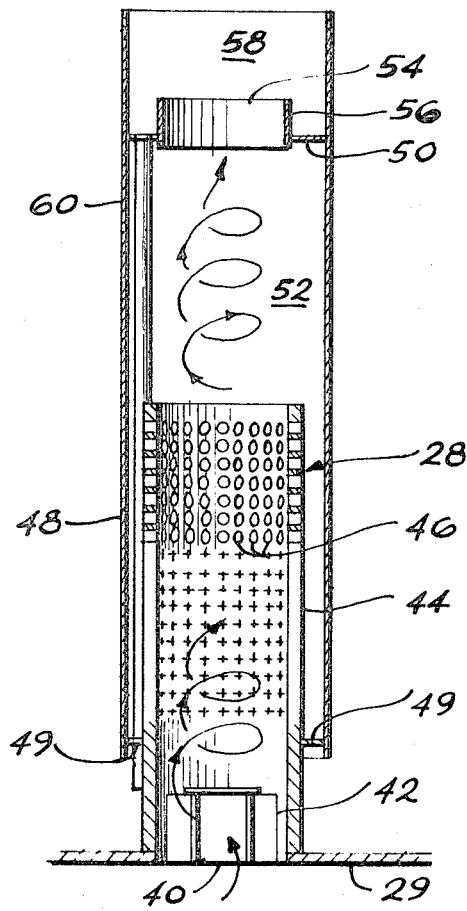
FIG. 3 is an enlarged sectional view of one of the "cells" of the water separator.

The "cell" arrangements 28 of separator section 26 completely cover the area above plate 29, as shown in FIG. 2. Looking now to FIG. 3, one separator 28 is shown in enlarged view. Each of the separators 28 are identical, and they have common walls in their outer housing or casing 48, as can be seen in FIG. 2. A circular opening 40 is provided in the plate 29. The steam-water mixture passing upwardly through this opening encounters a spinning vane assembly 42, positioned in the lower portion of cylindrical member 44, which causes the mixture to flow spirally upward. Above the spinning vanes 42, there are a large number of holes 46 in the walls of the cylindrical member 44. These holes 46 allow much of the heavier water to separate out due to centrifugal force. This separated water impinges on the walls of housing 48, running downwardly thereon, and fall off the lower edges of housing 48 onto the upper surface of plate 29. The housing 48 can be supported in any suitable manner. As illustrated, brackets 49 support the housing walls 48 from the cylinder 44.

The steam-water mixture exiting from the top of cylindrical member 44 expands into the chamber 52. Since there is appreciable spin left in the flow, a large proportion of the remaining 3–6 percent water in the steam is thrown outwardly onto the walls of housing 48. The remaining mixture, now containing 2–3 percent water, flows through circular opening 54 in plate 50, with some spin left. By this time, depending of the original percentage of water to steam, the large majority of water has been separated. However, a normal mixture from a typical steam generator may be three parts water and one part steam. Thus some water particles will be flung outwardly onto the walls of housing 48 above the plate 50. This water runs down and collects on the upper surface of the plate 50, and is discharged through pipe 60 back to a point above plate 29. In like manner, each of the dryers in section 30 (FIG. 1), has a pipe 60, (one of which is shown), for draining water separated out in dryer section 30. Ring 56 surrounding the opening 54 acts as a dam to prevent water accumulating above the plate from being re-entrained in the flow up through opening 54.

The plate 50 has a dual function. It not only forms a collecting place for water separated out in chamber 58, but it also prevents water separated out in chamber 52 from becoming re-entrained. Because of the large centrifugal force in the fluid in chamber 52, some of the water continues its upwardly spiraling flow along the walls of housing 48 adjacent chamber 52. Such water encounters the lower surface of plate 50, causing the water to lose its momentum, and the force of gravity takes over, causing the water to flow down the walls of housing 48.

The separator of the present invention is an efficient, high capacity water separator that can be easily manufactured and installed. In tests, it has been possible to effectively separate the water from the steam when the mixture entering the separator is 75 percent water, and it is flowing at a velocity approaching 10 feet per second. There is less than 1 percent water in the steam leaving the separator that is flowing to the dryer section.

What is claimed is:

1. A separator for separating water from steam including in combination a plate, a plurality of openings in the plate through which a water-steam mixture flows upwardly, a cylindrical member surrounding each of the openings and extending upwardly above the plate, spinner vanes positioned in the bottom portion of each cylindrical member for imparting centrifugal force to the water-steam mixture flowing upwardly therethrough, housing means made up of vertical wall means spaced horizontally from and surrounding each of the cylindrical members, each housing means extending from a lower point slightly spaced from the plate to an upper point above the upper end of the cylindrical members, each cylindrical member having a plurality of rows of circumferentially spaced, horizontally directed passageways therein, through which water from the rotatably flowing water-steam mixture can be separated, plate means positioned above the cylindrical members within each of the housing means, said plate means completely blocking the flow passage within each housing means except for a central opening which is in alignment with its associated cylindrical member, each housing means having wall means in common with the next adjacent housing means.

2. The separator set forth in claim 1, wherein the central opening in each of the plate means is circular, cylindrical ring means secured to each of the plate means surrounding each circular opening and extending partially below and partially above the opening, so as to form a dam, preventing separated water above the plate means from running downwardly into the circular openings, and drainage means above each of the plate means, through which separated water can be removed.

3. The separator set forth in claim 1, wherein each of the housing means is square in cross section.

* * * * *